United States Patent [19]

della Porta

[11] Patent Number: 4,991,619

[45] Date of Patent: Feb. 12, 1991

[54] HIGH PURITY GAS DELIVERY CONTROL ASSEMBLY

[75] Inventor: Paolo della Porta, Milan, Italy

[73] Assignee: SAES Getters SpA, Milan, Italy

[21] Appl. No.: 451,183

[22] Filed: Dec. 15, 1989

[30] Foreign Application Priority Data

Jan. 4, 1989 [IT] Italy .............................. 19009 A/89
Oct. 27, 1989 [IT] Italy .............................. 22154 A/89

[51] Int. Cl.$^5$ .......................... F16K 1/10; F16K 41/10; F16K 41/18
[52] U.S. Cl. .................................... 137/240; 251/330; 251/335.3
[58] Field of Search ............................. 251/335.3, 330; 137/240

[56] References Cited

U.S. PATENT DOCUMENTS

| 4,421,298 | 12/1983 | Kujawski | 251/335.3 X |
| 4,431,159 | 2/1984 | Stubbs | 251/335.3 X |
| 4,570,665 | 2/1986 | Zimmerly | 137/240 |
| 4,909,271 | 3/1990 | Canaan et al. | 251/335.3 X |

Primary Examiner—Arnold Rosenthal
Attorney, Agent, or Firm—David R. Murphy

[57] ABSTRACT

The invention relates to a high purity gas delivery control assembly (100) having straight through gas flow. The bellows (118) which operates a gas flow interruption means (114) is isolated during gas flow and dead volumes are reduced to a minimum. This prevents the introduction of unwanted particles into the gas stream.

6 Claims, 3 Drawing Sheets

HIGH PURITY GAS DELIVERY CONTROL ASSEMBLY

BACKGROUND TO THE INVENTION

It is known that in many industrial processes it is necessary to control the flow of process gases. In the manufacture of semiconductor devices such as integrated circuits the process gases used must be of high purity and must be particle free. With the ever increasing density of circuit components on semiconductor "chips" it is increasingly necessary to reduce contamination levels of these process gases.

Unfortunately one source of particle cotamination of the process gases comes from the gas delivery or control assembly itself. There are two main types of gas delivery assemblies, industrially known as valves, which are used to open or close the gas flows during semiconductor device manufacture. The first type uses a diaphragm to interrupt the gas flow but this requires the use of non-linear gas flows which can cause turbulence provoking the production of small particles and causing undesired pressure drops across the delivery assembly. A second type of gas delivery assembly has a "straight through" gas flow and uses a bellows assembly incorporating a translation means and a seat seal to open or close the gas flow. While this second type of gas delivery assembly solves the problems caused by excessive pressure drops, it suffers from several drawbacks.

A bellows configuration has an undulating surface and therefore a large surface area which can act as a source of particles.

Furthermore, movement of the bellows during opening and closing of the gas delivery assembly can create additional particles due to deformation of its surface.

If the bellows assembly is made longer, less relative movement is required to open and close the gas flow. However the surface area of the bellows is increased thus increasing the possibility of loose particle production. Furthermore the walls of the bellows enclosure area are increased again increasing the probability of loose particle production. In addition this increases the dead volume exposed to the gas flow and hence increases the risk of turbulence. This turbulence itself can provoke increased particle production and also create an increased pressure drop across the gas delivery assembly.

Prior art gas delivery assemblies are difficult to purge efficiently to remove particles.

It is therefore an object of the present invention to provide a high purity gas delivery control assembly free from one or more of the defects of prior art gas delivery control assemblies.

Another object of the present invention is to provide a high purity gas delivery control assembly free from the introduction of particles into the gas flow.

It is another object of the present invention to provide a high purity gas delivery control assembly easy to purge.

It is yet another object of the present invention to provide a high purity gas delivery control assembly having only a very small dead volume.

Additional objects and advantages of the high purity gases delivery control assemblies of the present invention will become apparent to those skilled in the art by reference to the following detailed description thereof and drawings wherein:

DETAILED DESCRIPTION OF THE INVENTION

The present invention provides a high purity gas delivery control assembly which comprises a body having a high purity gas flow inlet port and a high purity gas flow outlet port. There is also a gas flow interruption means translation channel and a seat seal receiving surface located at the intersection between the inlet port and the translation channel.

There is also provided a gas flow interruption means to control the delivery of high purity gas, located between the high purity gas flow inlet port and the high purity gas flow outlet port. The gas flow interruption means is situated within an interruption means translation channel. The interruption means comprises a bellows assembly provided with a translation means and a gas flow sealing assembly which comprises a dead volume defining means located adjacent to the bellows assembly and also a seat seal distanced away from the dead volume defining seal.

There is also provided a bellows volume isolation means.

Figure 1:
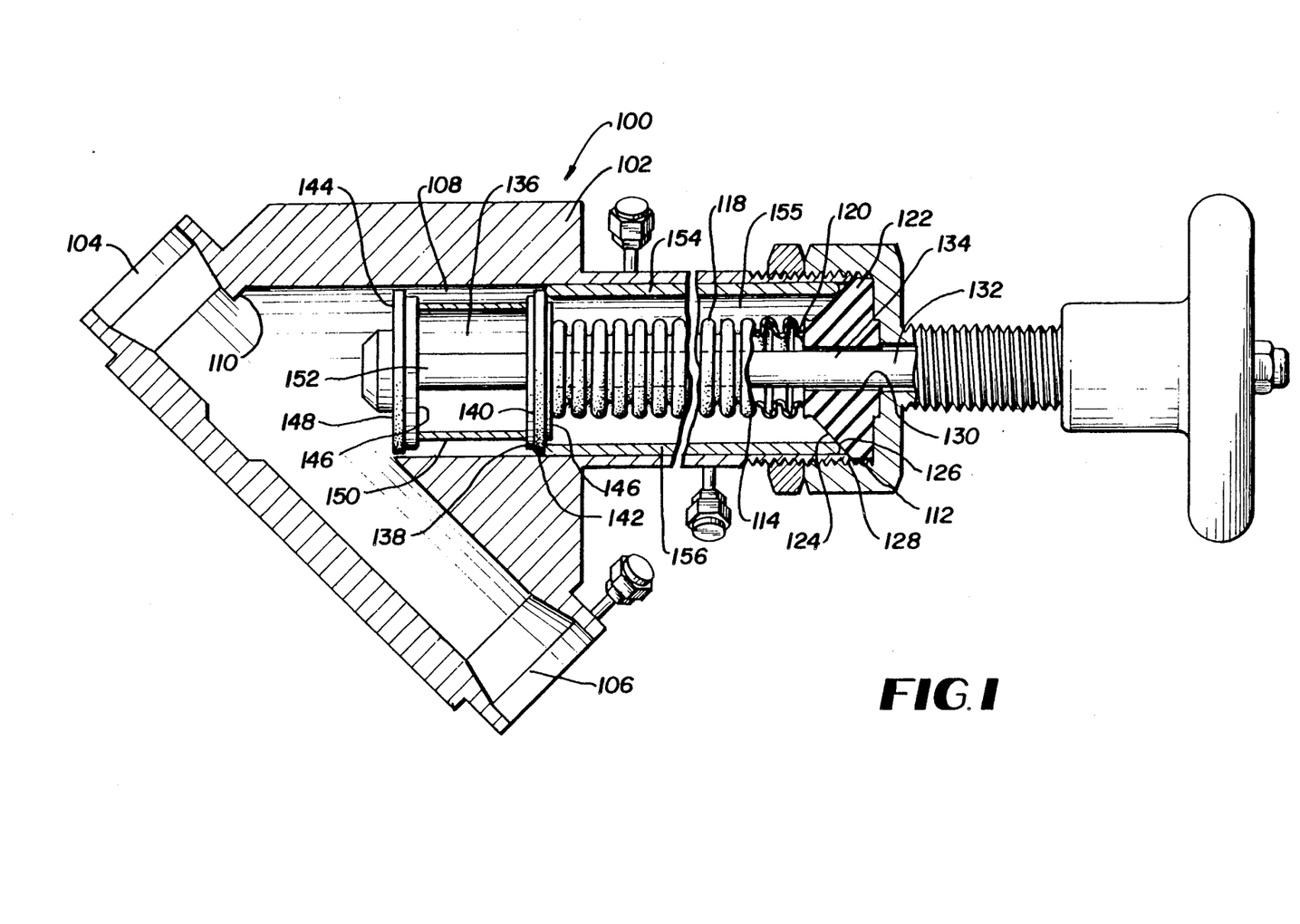
FIG. 1 is a cross sectional drawing of a high purity gas delivery control assembly of the present invention in the open position.

Referring now to the drawings and in particular to FIG. 1 there is shown a high purity gas delivery control assembly 100 of the present invention.

Control assembly 100 comprises a stainless steel body 102 provided with a high purity gas flow inlet port 104. Inlet port 104 preferably has a circular cross section. Body 102 is also provided with a high purity gas flow outlet port 106 which is again preferably of circular cross section having the same diameter as inlet port 104 with which it is coaxial. Body 102 is also provided with a gas flow interruption means translation channel 108 having a circular cross section of diameter greater than that of the inlet port 104. The axis of gas flow interruption means translation channel 108 is at an angle with respect to the axis of the inlet and outlet ports 104, 106. Preferably this angle is of about 45°. Translation channel 108 terminates within body 102 in a cone shaped seat seal receiving surface 110 located at the intersection between translation channel 108 and inlet port 104. Furthermore translation channel 108 terminates externally to body 102 in a gas flow interruption means support end 112.

There is also provided a gas flow interruption means 114 which controls the delivery of high purity gas. It is located between the high purity gas flow inlet port 104 and the high purity gas flow outlet port 106. It is positioned within the interruption means translation channel 108. Gas flow interruption means 114 comprises a bellows assembly 116 which consists of a bellows 118 of circular cross section. The first end 120 of bellows 118 is sealed in a gas tight manner to a gas flow interruption means seal 122 which is preferebly of conical shape and whose conical surface 124 forms a gas tight seal with a surface 126 which is preferably curved on the external termination 128 of translation channel 108. The conically shaped seal 122 has a coaxial cylindrical hole 130 through which passes a translation means 132. Translation means 132 is preferably in the form of a cylindrical rod 134. The second end of bellows 118 is connected in a gas tight manner to a gas flow sealing assembly 136 which comprises a dead volume defining means 138. Dead volume defining means 138 comprises a first stainless steel disc 140 which has a diameter less than the diameter of the translation channel 108. Furthermore a dead volume disc 142 which may for instance be of the flexible material sold as "Kel-F" having a diameter greater than that of seal disc 140 and slightly less than the diameter of translation channel 108 is in abutting relationship therewith.

Gas flow sealing assembly 136 further comprises a seat seal 144 consisting of a second stainless steel disc 146 having a diameter less than the diameter of the translation 108 and having in abutting relationship therewith a seat seal disc 148 which again may for instance be of the flexible material called "Kel-F".

Dead volume defining means 138 and seat seal 144 are distanced apart by means of a hollow stainless steel cylinder 150 and are held rigidly together by a coupling means 152. it is preferable that the dead volume defining means 138 and seat seal 144 are distanced apart by a distance equivalent to that necessary to open and close the gas delivery control assembly 100.

A bellows volume isolation means 154 is provided such that when the gas delivery control assembly 100 is in the open position there is defined an isolated bellows volume 155. Preferably bellows volume isolation means 154 is in the form of a stainless steel cylinder 156 attached to inner wall 158 of translation channel 108 at a position between dead volume defining means 138 and gas flow interruption means seal 122. Stainless steel cylinder 156 may be hermetically attached to gas flow interruption means seal 122.

Figure 2:
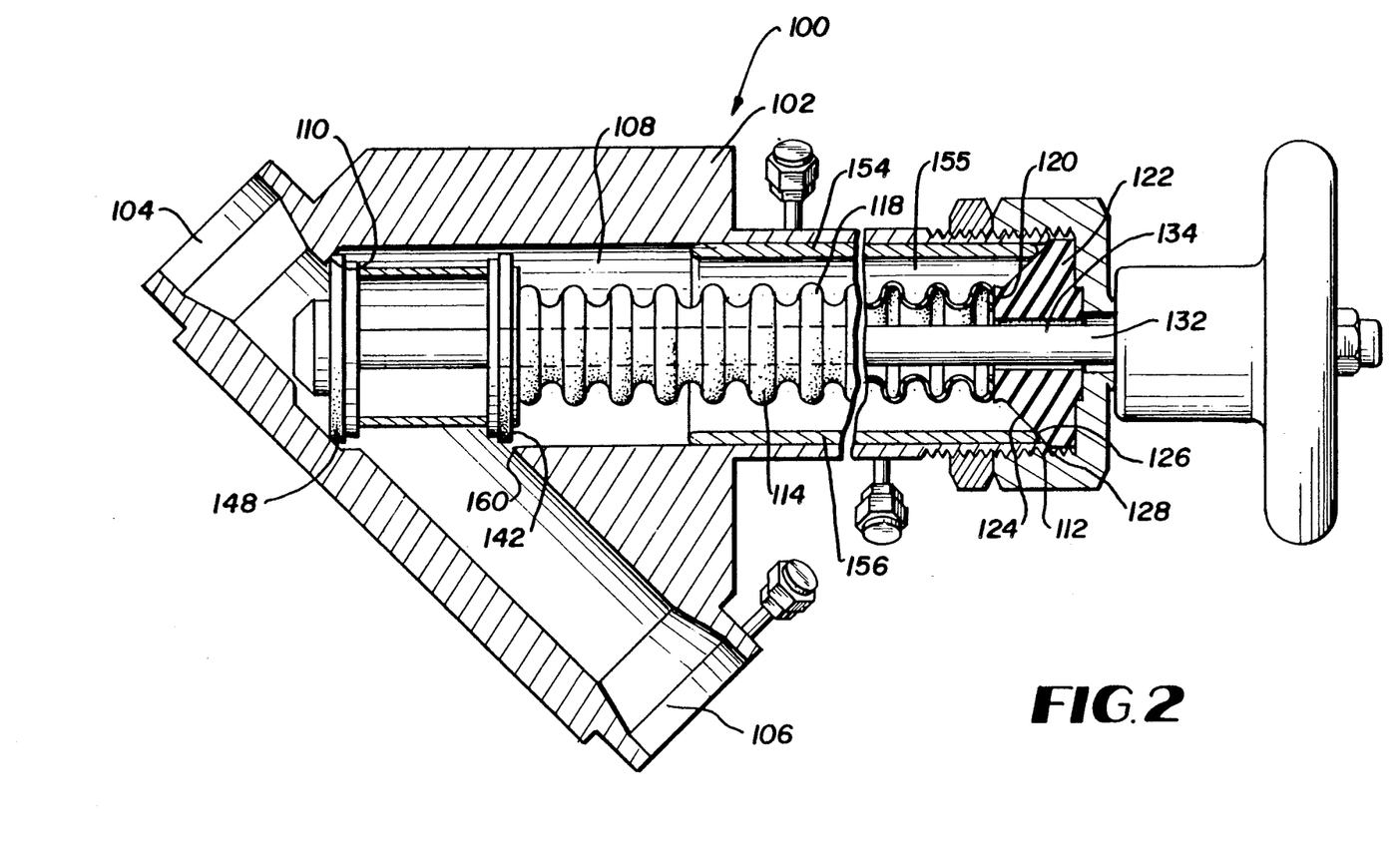
FIG. 2 is a cross sectional drawing of a high purity gas delivery control assembly of the present invention in the closed position.

Referring now to FIG. 2 there is shown the high purity gas delivery control assembly 100 of the present invention as described in detail in FIG. 1 in the open position but here shown in the closed position. Gas flow interruption means 114 is now in such a position that seat seal disc 148 is in contact with cone shaped seat seal receiving surface 110. It is seen that dead volume seal disc 142 is in the proximity of point 160 where gas flow interruption means translation channel 108 meets high purity gas flow outlet port 106.

The high purity gas delivery control assembly 100 can be provided with purge ports 162, 164 on the interruption means translation channel 108 in fluid communication with the isolated bellows volume 155. Thus when the control assembly 100 is in the open position any particles which have been produced by the bellows can be purged by means of a flow gas through the isolated volume 155. Successively when closing the gas delivery control assembly 100 no particles are released into high purity gas flowing through the outlet port 106. However any particles which are created within gas flow interruption means translation channel 108 can be removed by means of gas purging from a gas purge port 166 situated near outlet port 106 via one of the purge ports 162, 164 in fluid communication with the isolated bellows volume 155.

Figure 3:
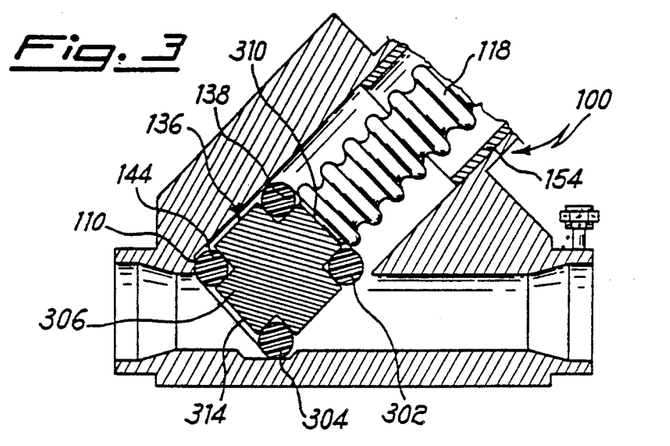
FIG. 3 is a partially cut-away cross section of a high purity gas delivery assembly incorporating a preferred embodiment of a gas flow sealing assembly.
Figure 4:
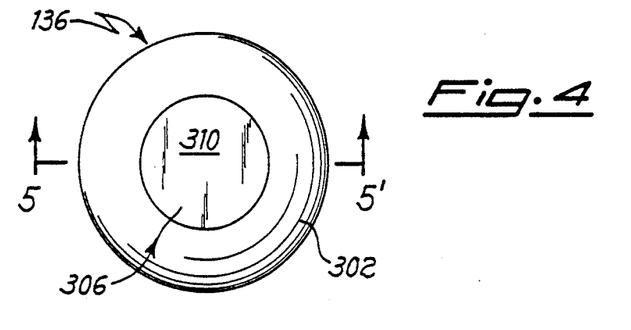
FIGS. 4 and 5 are respectively a plan view and a cross sectional view taken along line 5—5' of FIG. 4 of the gas flow sealing assembly of FIG. 3.
Figure 5:
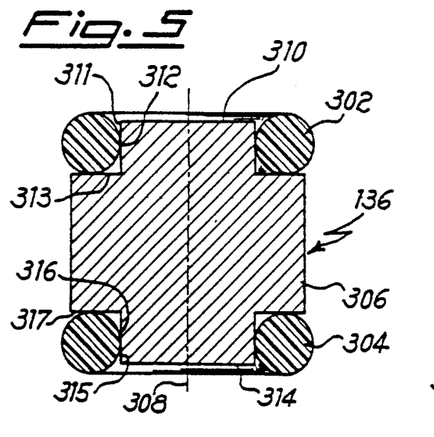
Figure 6:
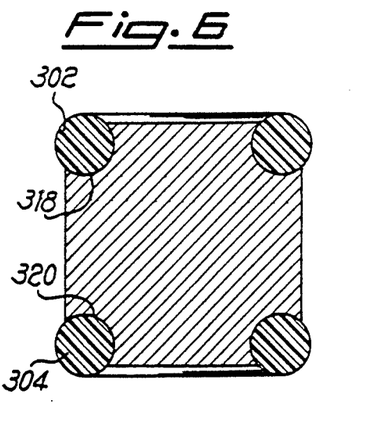
FIG. 6 is a cross sectional view, similar to FIG. 5, of an alternative embodiment of the gas flow sealing assembly.

Referring now to FIG. 3, in which identical parts are indicated with the same numbers as in FIGS. 1 and 2, a partially cut-away cross section of a high purity gas delivery assembly according to the invention shows an alternative, preferred embodiment of the flow sealing assembly of which FIGS. 4-6 are further, more particular representations. There is shown a gas flow sealing assembly 136 comprising a dead volume defining means 138 which now is in the form of a flexible circular gasket 302 with a convex curved surface for contacting with a bellows volume isolation means 154 and preferably having a circular cross section. Assembly 136 also comprises a seat seal 144 now having the form of a flexible circular gasket 304 with a convex curved surface for contacting with a cone shaped seat seal receiving surface 110, and preferably also having a circular cross section. Both gaskets may for instance be of the flexible material called "Kel-F". Assembly 136 also comprises a distancing means 306, for maintaining said dead volume defining means and said seat seal coaxially distanced from each other, having a circular cross section with an axis of rotation 308. Distancing means 306 has a first end surface 310 which is perpendicular to axis 308 and is adapted to be sealed to a bellows 118. Distancing means 306 also has a first circumferential step 312 adjacent to surface 310 and penetrating both axially, by means of a first axial step wall 311, and radially, by means of a first radial step wall 313 into distancing means 306 for a distance slightly less than the diameter of the cross section of dead volume defining means 302. Step 312 retains means 302 which contacts both walls 311 and 313 in a gas tight manner. Distancing means 306 also has a second end surface 314 perpendicular to axis 308. Adjacent second surface 314 there is a second circumferential step 316 which penetrates both axially, by means of a second axial step wall 315, and radially, by means of a second radial step wall 317, into distancing means 306 for a distance slightly less than the diameter of the cross section of seat seal 304. Second step 316 retains seat seal 304 which contacts both walls 315 and 317 in a gas tight manner. The gaskets can be heat shrunk into the steps of distancing means 306.

Referring now in particular to FIG. 3 the first end surface 310 of assembly 136 is welded to bellows 118. As shown in FIG. 3 seat seal 304 is in contact with cone shaped seat seal receiving surface 110 for interrupting gas flow through gas delivery assembly 100. When gas flows dead volume defining means 302 is in contact with a bellows volume isolating means 154 and high purity gas flows through the gas delivery assembly.

It should be appreciated that both circular gaskets 302 and 304 could be retained in housings having a shape different from the steps 312, 316 as illustrated in FIG. 5. FIG. 6 shows an alternative preferred embodiment according to which the gaskets 302, 304 are housed in seats 318, 320 respectively, having a circular cross section.

Although the invention has been described in considerable detail with reference to certain preferred embodiments designed to teach those skilled in the art how best to practice the invention, it will be realized that other modifications may be employed without departing from the spirit and scope of the appended claims.

I claim:

1. A high purity gas delivery control assembly (100) comprising:
   A. a stainless steel body (102) having:
      a. a high purity gas flow inlet port (104) of circular cross section;
      b. a high purity gas flow outlet port (106) of circular cross section coaxial with said inlet port (104) and having the same diameter;
      c. a gas flow interruption means translation channel (108) having a circular cross section of diameter greater than that of the inlet port and whose axis is at about 45° to the axes of the inlet and outlet ports, the translation channel (108) terminating within said body;
      d. a cone shaped seat seal receiving surface (110) located at the intersection between said translation channel and said inlet port and furthermore said translation channel terminating externally to said body; and
      e. a gas flow interruption means support end (112);
   B. a gas flow interruption means (114), to control the delivery of high purity gas, located between the high purity gas flow inlet port and the high purity gas flow outlet port, and within said interruption means translation channel, said interruption means comprising:
      a. a bellows assembly (116) comprising:
         i) a bellows (118) of circular cross section the first end (120) of which is sealed in a gas tight manner to
         ii) a conical shaped gas flow interruption means seal (122) whose conical surface (124) forms a gas tight seal with a curved surface (126) on the external termination (128) of the translation channel (108), the conically shaped seal (122) having a coaxial cylindrical hole (130) through which passes,
      b. a translation means (132) in the form of a cylindrical rod (134); and
      c. a gas flow sealing assembly (136) comprising:
         (i) a dead volume defining means (138) comprising a first stainless steel disc (140) having a diameter less than the diameter of the translation channel (108) and a flexible dead volume seal disc (142) having a diameter greater than that of the seal disc (140) and slightly less than the diameter of the translation channel (108); and
         (ii) a seat seal (144) comprising a second stainless steel disc (146) having a diameter less than the diameter of the translation channel (108) and a flexible seat seal disc (148), said dead volume defining means (138) and said seat seal (144) being distanced apart by means of a hollow stainless steel cylinder (150) and held rigidly together by coupling means (152); and
   C. a bellows volume isolation means (154) in the form of a stainless steel cylinder (156) attached to inner wall (158) of translation channel (108) at a position between dead volume defining means (138) and conically shaped gas flow interruption means seal (122).
2. A high purity gas delivery control assembly comprising: in which said gas flow sealing assembly (136) comprises:
   A. a dead volume defining means (138) in the form of a circular gasket (302) having a convex curved surface for contacting with said bellows volume isolation means (154);
   B. a seat seal (144) in the form of a circular gasket (304) having a convex curved surface for contacting with said cone shaped seat seal receiving surface (110); and
   C. distancing means (306) for maintaining said dead volume defining means (138, 302) and said seat seal (144, 304) coaxially distanced from each other.
3. A high purity gas delivery control assembly according to claim 2, wherein said circular gaskets (302, 304) are flexible and have a circular cross section.
4. A high purity gas delivery control assembly according to claim 3, wherein said distancing means (306) has:
   A. a circular cross section;
   B. an axis of rotation (308);
   C. a first end surface (310) perpendicular to said axis of rotation (308) adapted to be sealed to said bellows (118);
   D. a first circumferential step (312) adjacent said first end surface (310), penetrating both axially and radially into said distancing means (306) for a distance slightly less than the diameter of the cross section of said dead volume defining means (138, 302), said first step retaining said dead volume defining means;
   E. a second end surface (314) perpendicular to said axis of rotation (308); and
   F. a second circumferential step (316) adjacent said second end surface (314) penetrating both axially and radially into said distancing means (306) for a distance slightly less than the diameter of the cross section of said seat seal (144, 304), said second step retaining said seat seal.
5. A high purity gas delivery control assembly according to claim 3, wherein said distancing means (306) has:
   A. a circular cross section;
   B. an axis of rotation (308);
   C. a first end surface (310) perpendicular to said axis of rotation (318) adapted to be sealed to said bellows (118);
   D. a first circumferential housing (318) adjacent said first end surface (310) penetrating both axially and radially into said distancing means (306) for a distance slightly less than the diameter of the cross section of said dead volume defining means, said first housing retaining said dead volume defining means and having a circular cross section;
   E. a second end surface (314) perpendicular to said axis of rotation (308); and
   F. a second circumferential housing (320) adjacent said second end surface penetrating both axially and radially into said distancing means (306) for a distance slightly less than the diameter of the cross section of said seal, said second step retaining said seat seal, and having a circular cross section.
6. A high purity gas delivery control assembly according to claim 1, provided with at least two purge ports on the interruption means translation channel in fluid communication with the isolated bellows volume (155).

* * * * *

UNITED STATES PATENT AND TRADEMARK OFFICE
CERTIFICATE OF CORRECTION

PATENT NO. : 4,991,619

DATED : Feb. 12, 1991

INVENTOR(S) : Paolo Della Porta

It is certified that error appears in the above-identified patent and that said Letters Patent is hereby corrected as shown below:

In column 5 and 6, delete claim 2 and insert claim 2 as shown on the attached sheets.

UNITED STATES PATENT AND TRADEMARK OFFICE
CERTIFICATE OF CORRECTION

PATENT NO. : 4,991,619

DATED : Feb. 12, 1991

INVENTOR(S) : Paolo Della Porta

It is certified that error appears in the above-identified patent and that said Letters Patent is hereby corrected as shown below:

Claim 2 should read as follows:
A. a metallic body (102) having:
   a. high purity gas flow inlet port (104) of circular cross section;
   b. a high purity gas flow outlet port (106) of circular cross section coaxial with said inlet port and having the same diameter;
   c. a gas flow interruption means translation channel (108) having a circular cross section diameter greater than that of the inlet port and whose axis is at an angle to the axes of the inlet and outlet ports, the translation channel terminating within said body;

d. a seat seal receiving surface (110) located at the intersection between said translation channel and said inlet port and furthermore said translation channel terminating externally to said body; and

UNITED STATES PATENT AND TRADEMARK OFFICE
CERTIFICATE OF CORRECTION

PATENT NO. : 4,991,619

DATED : Feb. 12, 1991

INVENTOR(S) : Paolo Della Porta

It is certified that error appears in the above-identified patent and that said Letters Patent is hereby corrected as shown below:

e. a gas flow interruption means support end (112);

B. a gas flow interruption means (114), to control the delivery of high purity gas, located between the high purity gas flow inlet port (104) and the high purity gas flow outlet port (106), and within said interrupiton means translation channel, said inerruption means comprising:

a. a bellows assembly (116) comprising:

i) a bellows (118) the first end (120) of which is sealed in a gas tight manner to       ii) a gas flow interruption means seal (122) forming a a gas seal with a surface (126) on the external termination (128) of the translation channel (108), the seal (122) having a hole (130) through which passes,     b. a. translation means (132); and     c. a gas flow sealing assembly (136) comprising:

i) a dead volume defining means (138); and ii) a seat seal (144), said dead volume defining means (138) and said seat seal (144) being distanced apart; and C.    a bellows volume isolation means (154) in the form of a stainless steel cylinder.

UNITED STATES PATENT AND TRADEMARK OFFICE
CERTIFICATE OF CORRECTION

PATENT NO. : 4,991,619

DATED : February 12, 1991

INVENTOR(S) : Paolo Della Porta

It is certified that error appears in the above-identified patent and that said Letters Patent is hereby corrected as shown below:

in which said gas flow sealing assembly (136) comprises:
said dead volume defining means (138) being in the form of
a circular gasket (302) having a convex curved surface
for contacting with said bellows volume isolation means (154);
said seal (144) being in the form of a circular gasket (304)
having a convex curved surface for contacting with said cone
shaped seat seal receiving surface (110); and distancing means
means (306) for maintaining said dead volume defining means(138, 302)
and said seat seal (144, 304) coaxially distanced from each other.

Signed and Sealed this

Tenth Day of March, 1992

Attest:

HARRY F. MANBECK, JR.

*Attesting Officer*      *Commissioner of Patents and Trademarks*